US011059101B2

(12) United States Patent
Das et al.

(10) Patent No.: US 11,059,101 B2
(45) Date of Patent: Jul. 13, 2021

(54) CONFORMAL MATERIAL AND SUPPORT STRUCTURES FOR ADDITIVE MANUFACTURING SYSTEMS AND METHODS OF USE THEREOF

(71) Applicant: DDM SYSTEMS, INC., Atlanta, GA (US)

(72) Inventors: Suman Das, Atlanta, GA (US); Marvin Kilgo, Atlanta, GA (US)

(73) Assignee: DDM SYSTEMS, INC., Atlanta, GA (US)

( * ) Notice: Subject to any disclaimer, the term of this patent is extended or adjusted under 35 U.S.C. 154(b) by 525 days.

(21) Appl. No.: 15/431,461

(22) Filed: Feb. 13, 2017

(65) Prior Publication Data

US 2017/0232516 A1 Aug. 17, 2017

Related U.S. Application Data

(60) Provisional application No. 62/293,794, filed on Feb. 11, 2016.

(51) Int. Cl.
*B22F 10/20* (2021.01)
*B33Y 40/00* (2020.01)
*B33Y 70/00* (2020.01)
*B33Y 10/00* (2015.01)

(52) U.S. Cl.
CPC .............. *B22F 10/20* (2021.01); *B33Y 10/00* (2014.12); *B33Y 40/00* (2014.12); *B33Y 70/00* (2014.12); *B22F 2998/10* (2013.01); *B22F 2999/00* (2013.01); *Y02P 10/25* (2015.11)

(58) Field of Classification Search
CPC ...... B22F 2003/1042; B22F 2003/1058; B22F 3/1052; B22F 3/1055
See application file for complete search history.

(56) References Cited

U.S. PATENT DOCUMENTS

| 5,676,191 | A | * | 10/1997 | Bewlay | B22D 19/10 148/404 |
| 6,375,880 | B1 | * | 4/2002 | Cooper | B29C 33/52 264/138 |
| 8,994,592 | B2 | * | 3/2015 | Scott | B33Y 30/00 343/700 MS |
| 9,522,426 | B2 | | 12/2016 | Das et al. | |
| 2002/0062909 | A1 | * | 5/2002 | Jang | B29C 64/165 156/155 |

(Continued)

FOREIGN PATENT DOCUMENTS

DE 102014224176 A1 * 6/2016 ............. B33Y 30/00

OTHER PUBLICATIONS

DE-102014224176-A1 Machine Translation (Year: 2016).*

(Continued)

*Primary Examiner* — Paul A Wartalowicz
*Assistant Examiner* — Ryan L Heckman
(74) *Attorney, Agent, or Firm* — Troutman Pepper Hamilton Sanders LLP; Ryan A. Schneider; Brennan M. Carmody (57) ABSTRACT

Aspects of the disclosed technology include an additive manufacturing method including: applying a mixture of metal powder and a carrier agent to a substrate; removing a portion of the carrier agent from the applied mixture; and fusing the metal powder remaining in the applied mixture to the substrate.

14 Claims, 12 Drawing Sheets

(56) References Cited

U.S. PATENT DOCUMENTS

| | | | | |
|---|---|---|---|---|
| 2012/0193841 A1* | 8/2012 | Wang | ................... | B22F 3/1055 |
| | | | | 264/645 |
| 2014/0163717 A1* | 6/2014 | Das | ...................... | B22F 3/1055 |
| | | | | 700/119 |
| 2015/0079306 A1* | 3/2015 | Schoeneborn | ........ | B05C 19/008 |
| | | | | 427/551 |
| 2015/0157822 A1* | 6/2015 | Karpas | ................... | B29C 33/52 |
| | | | | 128/206.24 |
| 2015/0266235 A1* | 9/2015 | Page | ................... | B29C 64/386 |
| | | | | 425/145 |
| 2015/0300179 A1* | 10/2015 | Kamel | ..................... | B22F 5/04 |
| | | | | 416/196 R |
| 2016/0067923 A1* | 3/2016 | James | .................. | B29C 64/153 |
| | | | | 264/497 |
| 2017/0173692 A1* | 6/2017 | Myerberg | .............. | B22F 3/008 |

OTHER PUBLICATIONS ("Fused Filament Fabrication." Wikipedia, Wikimedia Foundation, Sep. 21, 2019, https://en.wikipedia.org/wiki/Fused_filament_fabrication (Year: 2019).*

("Design Guidelines for Direct Metal Laser Sintering (DMLS)." Crucible Design Ltd., Jul. 1, 2015, www.crucibledesign.co.uk/images/uploaded/guides/bs7000-part-2-a-management-guide-download-original.pdf (Year: 2015).*

("Design for 3D Printing: Easy Snap-Fit Parts with Maker Club" Pinshape 3D Printing Blog, Tutorials, Contests & Downloads, Feb. 2, 2016, pinshape.com/blog/design-for-3d-printing-easy-snap-fit-parts (Year: 2016).*

* cited by examiner

Related Art

CONFORMAL MATERIAL AND SUPPORT STRUCTURES FOR ADDITIVE MANUFACTURING SYSTEMS AND METHODS OF USE THEREOF

CROSS-REFERENCE TO RELATED APPLICATIONS

The present application claims priority from U.S. Provisional Patent Application Ser. No. 62/293,794, filed on Feb. 11, 2016 entitled Systems and Methods for Directed Energy Additive Manufacturing with Conformal Material Placement, which is incorporated herein by reference in its entirety.

TECHNICAL FIELD

The present disclosure is related to additive manufacturing and, more particularly, to conformal materials and support structures for additive manufacturing and systems and methods for placing conformal materials and using support structures.

BACKGROUND

In the related art, additive manufacturing from powders commonly involves layerwise consolidation of powder using a directed energy source that selectively melts or sinters the top layers in a powder bed. Related art powder bed methods include depositing fresh powder on the surface of the powder bed for each layer. Such methods rely on uniform application of thin layers of powder, which places severe restrictions on the nature of the powder, and may necessitate a large inventory of expensive powder.

An alternative related art method includes depositing loose powder in a path of a directed energy beam (e.g., in the path of a laser). In some related implementations, a gas-pressurized stream of powder is deposited near a melt pool created by the directed energy beam. However it is difficult to precisely direct a stream of loose powder. Such misdirected powder can be wasted, or partially melted and incorporated into the melt pool, lowering the quality of the product.

Figure 1A:
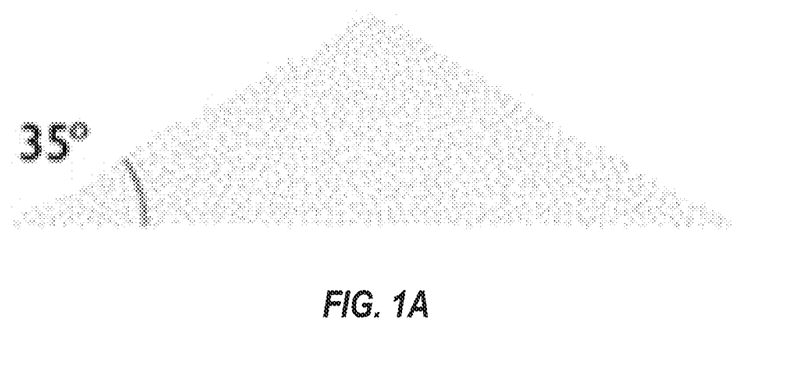
FIGS. 1A-1C illustrate example angles of repose for different sized and shaped granules.
Figure 1B:
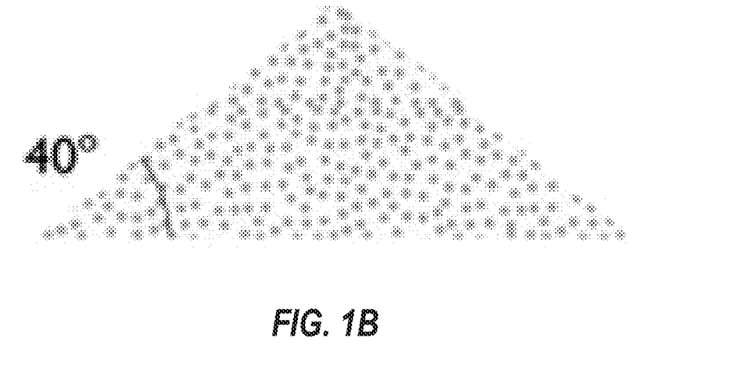
Figure 1C:
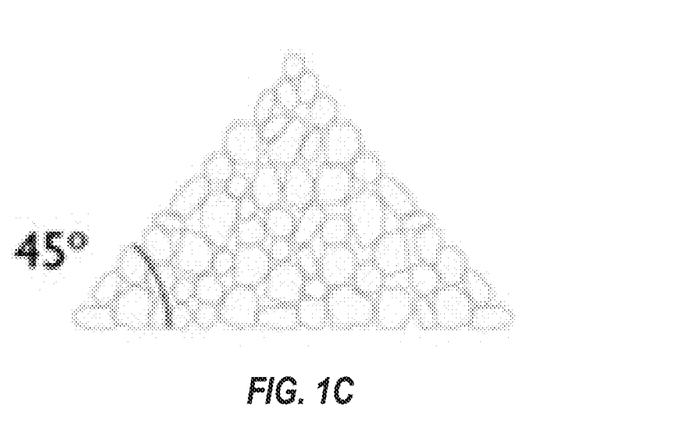

In the related art, the powder used in the related art is somewhat free-flowing. That is, the shape, thickness, and position of the applied powder are limited by the angle of repose of the powder. The angle of repose is the steepest angle of descent that can be maintained by a granular material. The angle of repose is determined, in part, by the size, shape, and uniformity of granules in the powder, as well as the material makeup of the powder and any substrate. A smaller angle of repose typically applies to more uniformly sized and rounder granules. For example, FIGS. 1A-1C illustrate exemplary angles of repose for a regularly sized material FIG. 1A, a somewhat irregular material FIG. 1B, and a largely irregular material FIG. 1C. As will be understood by one of ordinary skill, many powders in the related art have a relatively small angle of repose. In addition, in some cases, it is preferable to have a more free-flowing material. For example, metal powder with highly spherical, regularly sized particles may be more uniformly controlled and applied. However, such more free-flowing materials tend to have a relatively small angle of repose. Thus, conformal powder deposition on non-planar surfaces is difficult.

Figure 2:
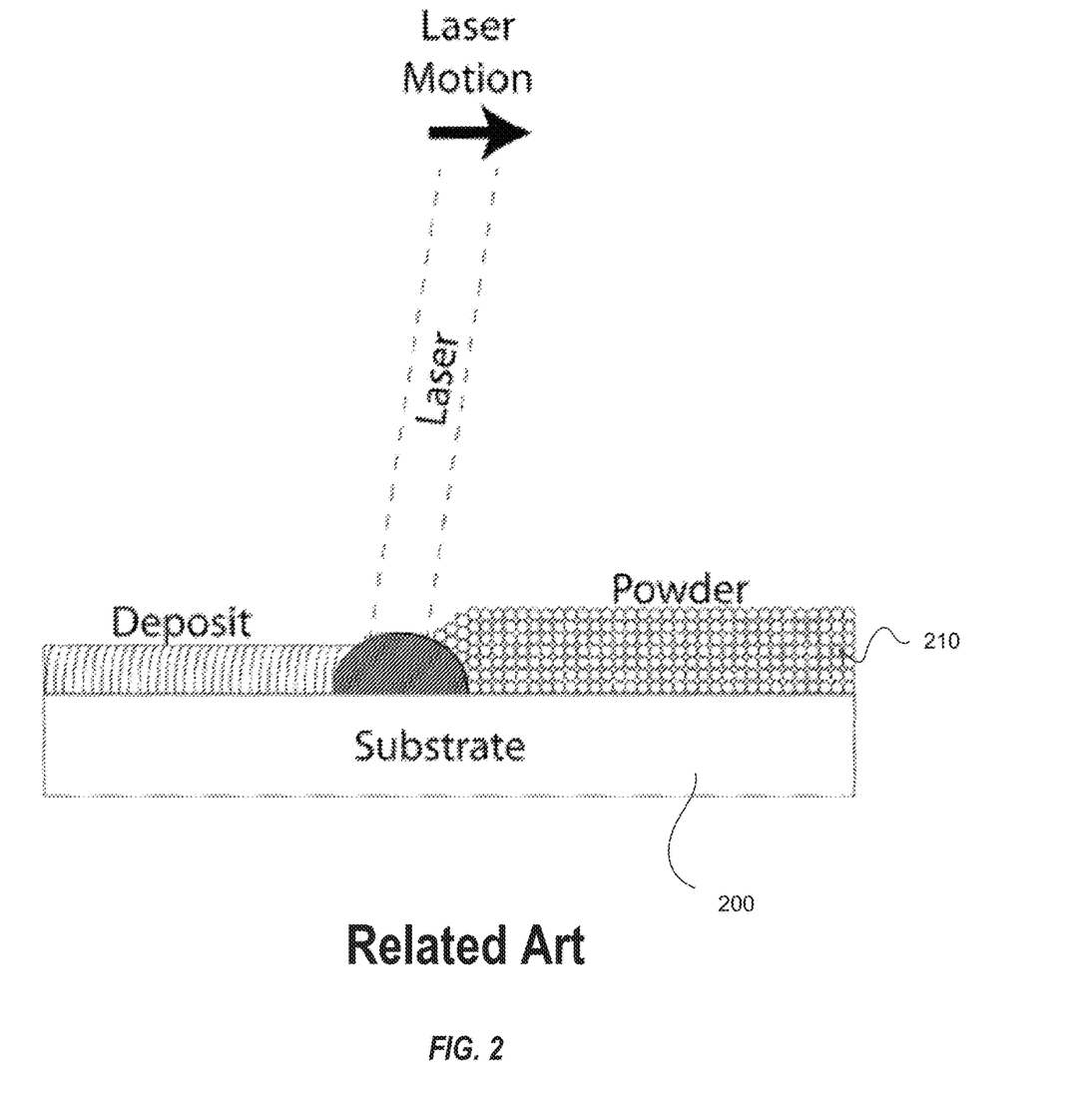
FIG. 2 illustrates the application of a powder layer on a relatively horizontal substrate.
Figure 3:
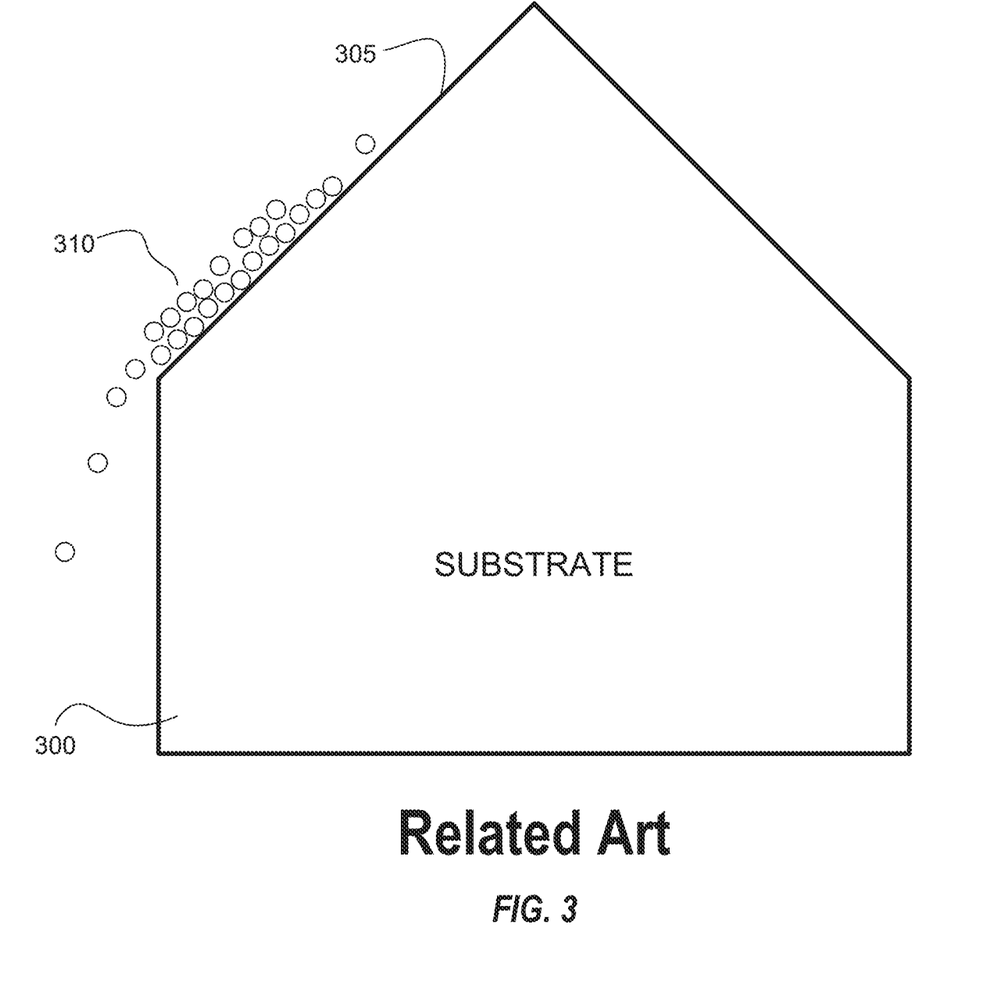
FIG. 3 illustrates an application of a powder layer on a substrate having an angle greater than an angle of repose.

FIG. 2 illustrates the application of a relatively thin powder 210 layer on a substantially horizontal substrate 200 in the related art. As a non-limiting example, in the related art, the powder layer may be limited to about $1000^{th}$ of an inch. Meanwhile, as can be seen in FIG. 3, in the related art, powder 310 cannot easily be applied to side 305 of a substrate 300 having an angle greater than the angle of repose of the powder.

Therefore, in the related art, applying powder selectively at certain locations, thicknesses, and shapes is difficult. Accordingly, there is a need for a system, method and product that may improve upon the related art systems and methods.

SUMMARY

Briefly described, and according to one embodiment, aspects of the present disclosure generally relate to a conformal material for additive manufacturing. According to some embodiments, there is provided an additive manufacturing method including: applying a mixture of metal powder and a carrier agent to a substrate; removing a portion of the carrier agent from the applied mixture; and fusing the metal powder remaining in the applied mixture to the substrate.

An angle of an application area of the mixture to the substrate may be greater than an angle of repose of the metal powder.

The method may further include shaping the mixture on the substrate before removing the carrier agent.

The mixture may be applied to conform to a shape of a surface of the substrate.

The mixture may be applied as a liquid, gel, or paste. The method may further include solidifying the applied mixture. The removing may include removing, from the solidified mixture, the carrier agent via sublimation.

The removing may include at least one of increasing a temperature of the applied mixture; and lowering an air pressure around the applied mixture.

The removing may include burning off a portion of the carrier agent.

A portion of the carrier agent may be removed by the fusing.

The method may further include: heating the mixture to a free-flowing state before applying the mixture; and cooling the applied mixture to a solid state before removing the carrier agent.

The mixture may further include a ceramic material, and the fusing may include fusing the metal powder and ceramic material to the substrate as a composite material.

The method may further include mixing the metal powder with the carrier agent.

According to some embodiments, there is provided an additive manufacturing method including: attaching a support structure to a substrate; applying metal powder to the substrate supported by the support structure; and fusing the metal powder to the substrate.

The method may further include removing the support structure after fusing the metal powder to the substrate.

The attaching the support structure may include: applying a first material as a slurry, paste, or gel to the substrate; and solidifying the applied first material to form the support structure.

The first material may be photosensitive, and the solidifying may include exposing the applied first material to ultraviolet light.

The metal powder may be fused to the substrate by Scanning Laser Epitaxy.

The applying the metal powder and the fusing the applied metal powder may be repeated to form layers of metal fused to the substrate.

The support structure may form a retaining wall on a portion of the substrate having an angle greater than an angle of repose of the metal powder.

The support structure may define a negative space surrounding a desired geometry for the fused metal powder on the substrate.

The support structure may be pre-formed and reusable.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

As discussed above, in the related art, the application of powders to particular locations is determined in part by the free-flowing nature of the powder. According to some aspects of the present disclosure, powder may be applied using self-supporting conformal shaped deposit, for example, as a conformal material. Thus, additive manufacturing may be performed without the use of a powder bed, and without the deposition of loose powder.

The conformal material may maintain its position until it is consolidated, for example, through sintering or melting by a directed energy source. In some embodiments, the directed energy beam can be a laser, an electron beam, or other sources, as will be understood by one of ordinary skill in the art. The location and geometry of application of the conformal material may not be restricted by the application of powder in the related art.

In some embodiments, the conformal material may be a combination of powder with a binder-vehicle system, e.g., a carrier agent. The carrier agent may enable the powder to flow while the conformal material is dispensed, but become rigid after deposition to maintain an applied shape. The carrier agent may be fugitive and may be removed from the deposited material prior to consolidation of the powder so that the carrier agent does not compromise the quality of the product, for example, by leaving an undesired residue.

In some embodiments, the carrier agent may include a component of the deposited and consolidated material. In some cases, the metal powder may be mixed with a ceramic material and a carrier agent. The carrier agent may be removed and a composite metal and ceramic mixture may be consolidated.

The conformal material may be dispensed on a substrate by, for example, extrusion, painting, spraying, brushing, rolling, or combinations thereof. In some embodiments, the powder-vehicle system can be applied by methods known in the art of additive manufacturing for depositing materials according to software-generated commands. Examples of this include ink-jet deposition of materials or binders, and robotically controlled extrusion.

In some cases, a support structure may be used to provide a platform for applying powders or conformal material. In some cases, a support structure may define a negative space to ease shaping powders or conformal materials. The use of a support structure may aid in using additive manufacturing on an existing part or more tightly constrain a region containing powder or conformal material.

In some uses, conformal shaped powder and support structures can enhance the application of coatings or repairs on existing components, such as, as a non-limiting example, through the use of the additive manufacturing method of Scanning Laser Epitaxy (SLE) as described for example, in U.S. Pat. No. 9,522,426, the disclosure of which is incorporated herein by reference in its entirety.

Figure 4:
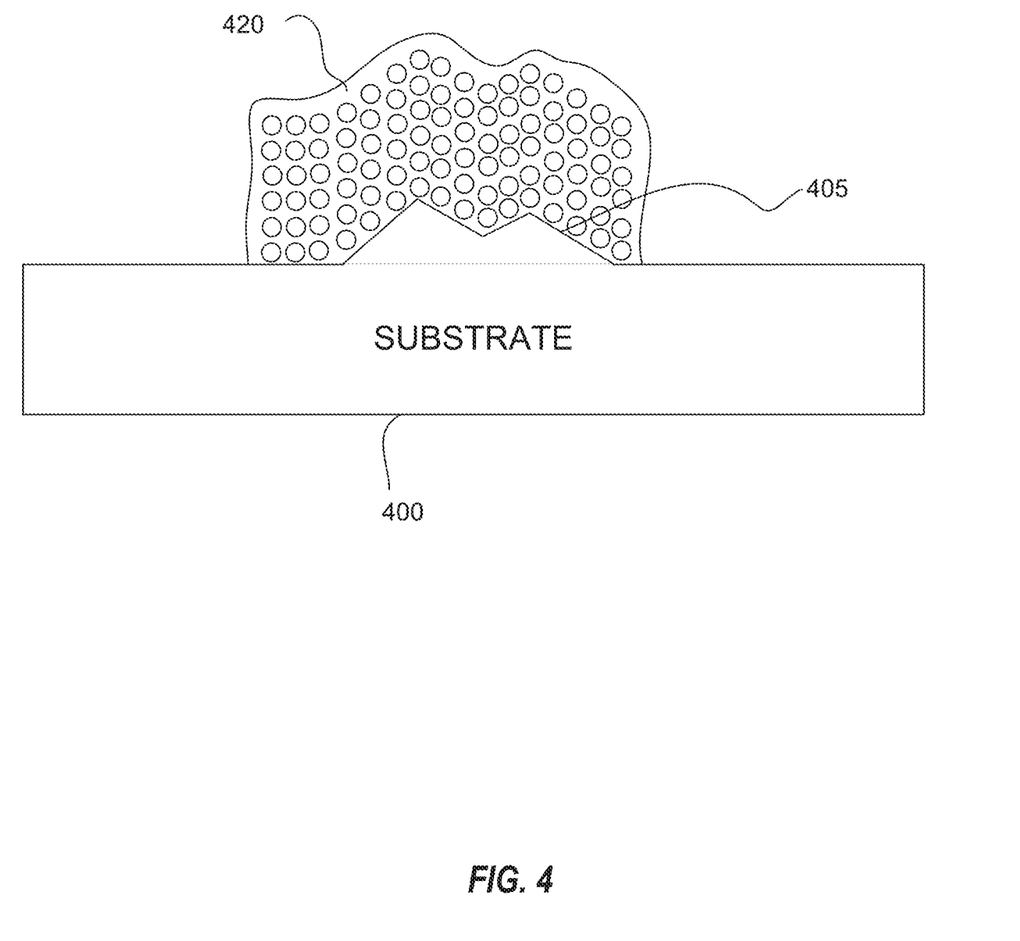
FIG. 4 illustrates application of a conformal material according to an example embodiment.

Referring to the drawings, FIG. 4 illustrates an application of a conformal material according to an example embodiment. As seen in FIG. 4, a substrate 400 has a substantially uneven surface 405 to which a mixture 420 is to be applied. The mixture 420 including metal powder is applied to the substantially uneven surface 405 in a conformal manner (e.g., the thickness of the mixture 420 is even across the uneven surface 405). In addition, in some embodiments, the mixture 420 may be applied relatively thickly, such as one tenth of an inch at a time per layer.

Figure 5:
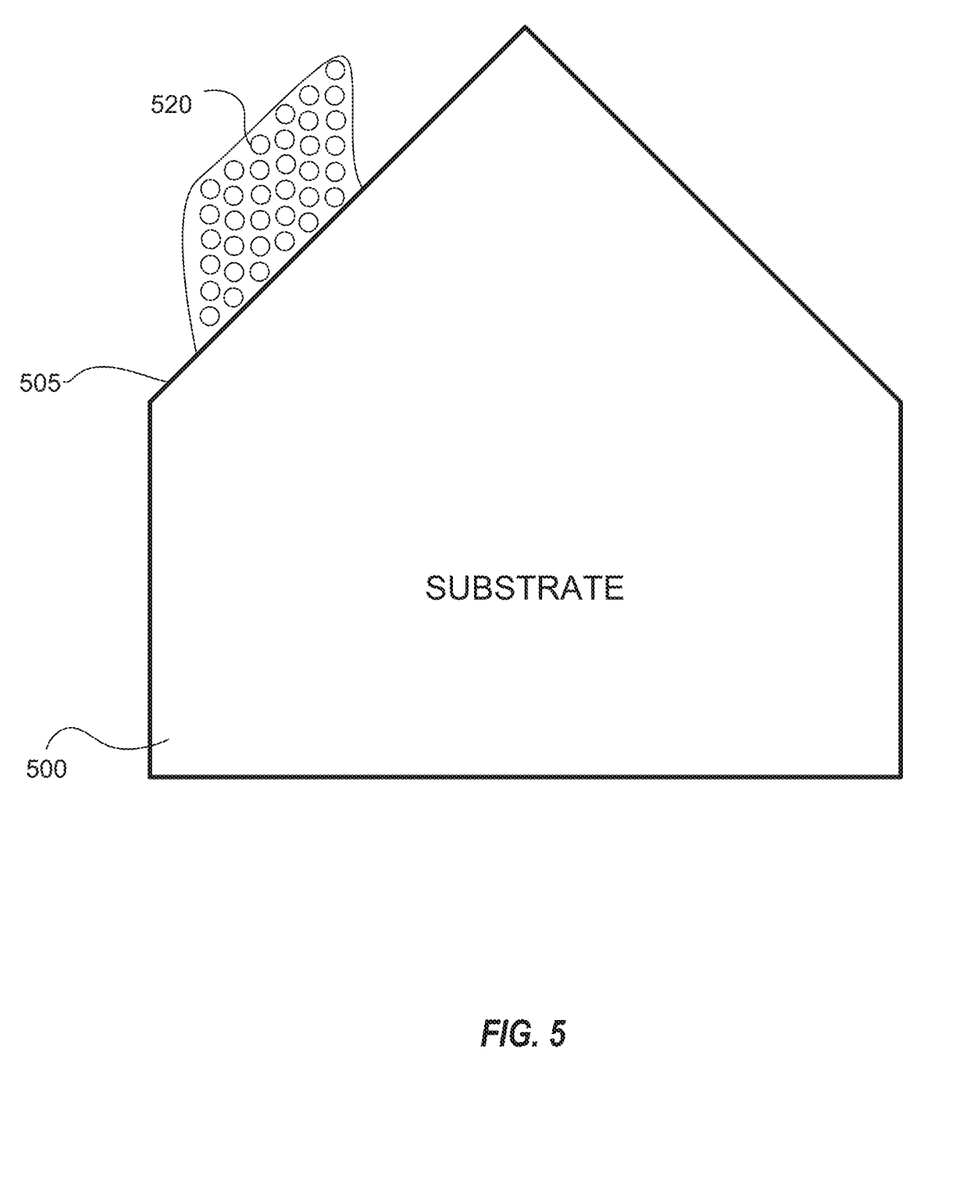
FIG. 5 illustrates application of a conformal material according to an example embodiment.

FIG. 5 illustrates an application of a conformal material according to an example embodiment. Referring to FIG. 5, a substrate 500 has a substantially slanted surface 505. A mixture 520 including the metal powder can be applied to the slanted surface 505 even through the slanted surface 505 has an angle greater than the angle of repose of the metal powder. Once applied, the metal powder may be fused to the substrate, for example, using SLE.

Figure 6:
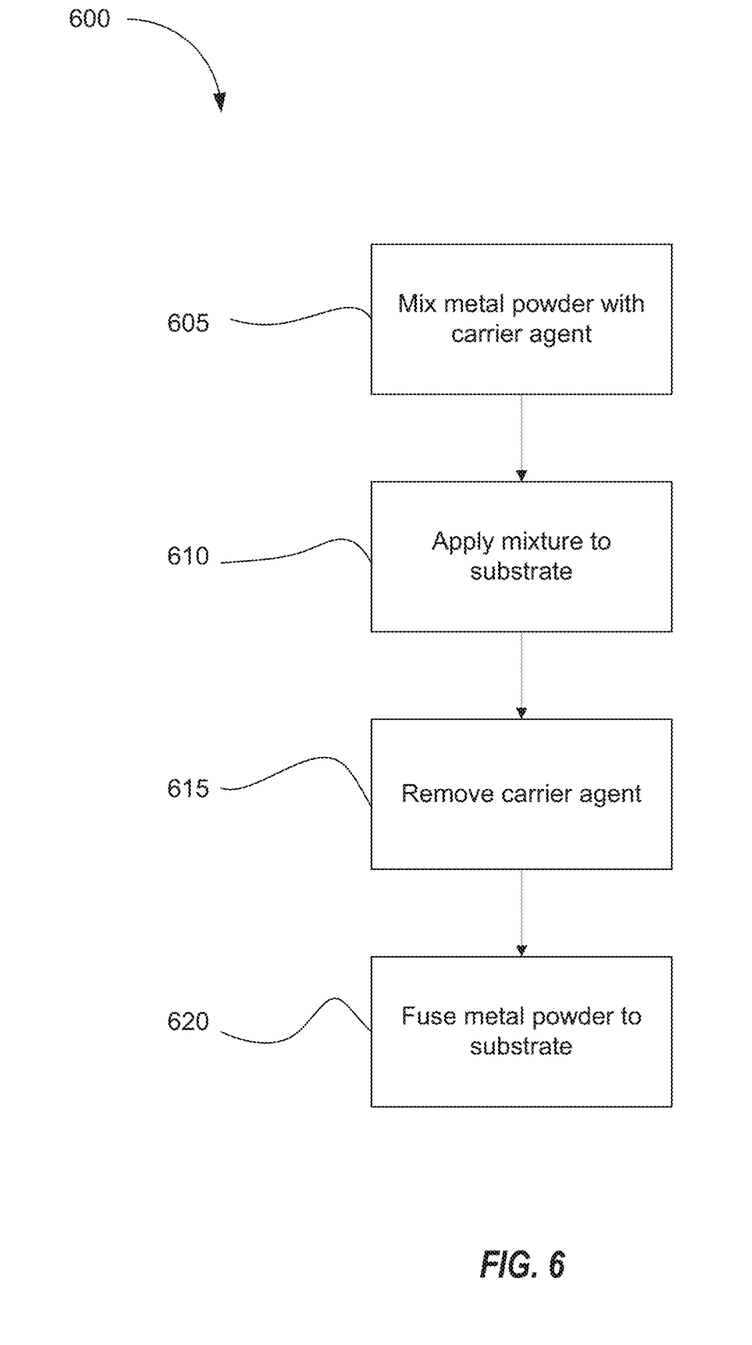
FIG. 6 is a flow diagram of a method of use of a conformal material according to an example embodiment.

FIG. 6 is a block diagram of an application method according to an example embodiment. The method 600 includes mixing 605 a metal powder with a carrier agent. The mixing 605 may result in mixture with a consistency of a slurry, a gel, or a paste. In some cases, the mixture may include additional elements, such as ceramic powder in addition to the metal powder. In some embodiments, a carrier agent may be selected to be mixed with the metal powder based, at least in part, on a type of metal in the metal powder, a morphology of the metal powder, desired thickness of the mixture layer, or slope angle of application areas. Non-limiting examples of carrier agents includes water, cyclohexane, tert-Butyl alcohol, camphene or other terpenoids, naphthalene, solvents, other vehicles known to one of skill in the art of powder suspension freeze casting, and carrier agents later identified for this purpose. In some embodiments, the metal powder and the carrier agent may be premixed, and the mixing may be performed by a third-party.

The mixture is applied 610 to a substrate. The mixture may be applied 610 to an application area on the substrate. In some embodiments, the applied mixture may be shaped on the substrate. For example, the mixture may be shaped to conform to a surface of the substrate. In embodiments, the mixture may be applied substantially uniformly across an application area on the substrate. In other embodiments, the mixture may be applied in varying thicknesses across the substrate, or shaped into custom geometries.

The mixture may be applied 610 as substantially free-flowing and then solidify. As a non-limiting example, the mixture may be applied as a liquid, for example, above the melting point of the carrier agent, and are then frozen to become rigid. In some embodiments, the carrier agent may solidify by gelation, thermal polymerization, photopolymerization that provide rigidity by binding the powder in a suitable gel, or a combination thereof. In some embodiments, a gelation carrier agent may be reactive to or become a component of the powder.

In some cases, the mixture of the metal powder and carrier agent may be stably solid at room temperature. The mixture may be heated to form a gel or paste and applied 610 to the substrate. Once applied 610, the mixture is then cooled to return to a solid state.

Once the mixture is applied 610, the carrier agent is removed 615. In some cases, the carrier agent may be removed 615 through sublimation or evaporation. In some embodiments, the removing 615 may include applying heat, for example, to the substrate or proximate to the applied mixture, or decreasing an air pressure surrounding the applied mixture to increase a rate or completeness of sublimation or evaporation of the carrier agent. In some embodiments, the carrier agent may be burned off of the applied mixture.

Once the carrier agent is removed 620, the metal powder may be fused with the substrate. For example, the metal powder may be fused 620 with the substrate, for example, through the use of SLE.

In some embodiments, a totality of the carrier agent is substantially removed 615 so that the carrier agent does not compromise or contaminate the final product. In some cases, a portion of the carrier agent may remain mixed with the metal powder. The carrier agent may be later burned off or expelled as the metal powder is fused 620. In some embodiments, a portion of the carrier agent (e.g., a ceramic material) may be incorporated with the metal powder to create a composite material when the metal powder is fused 620 to the substrate.

Figure 7:
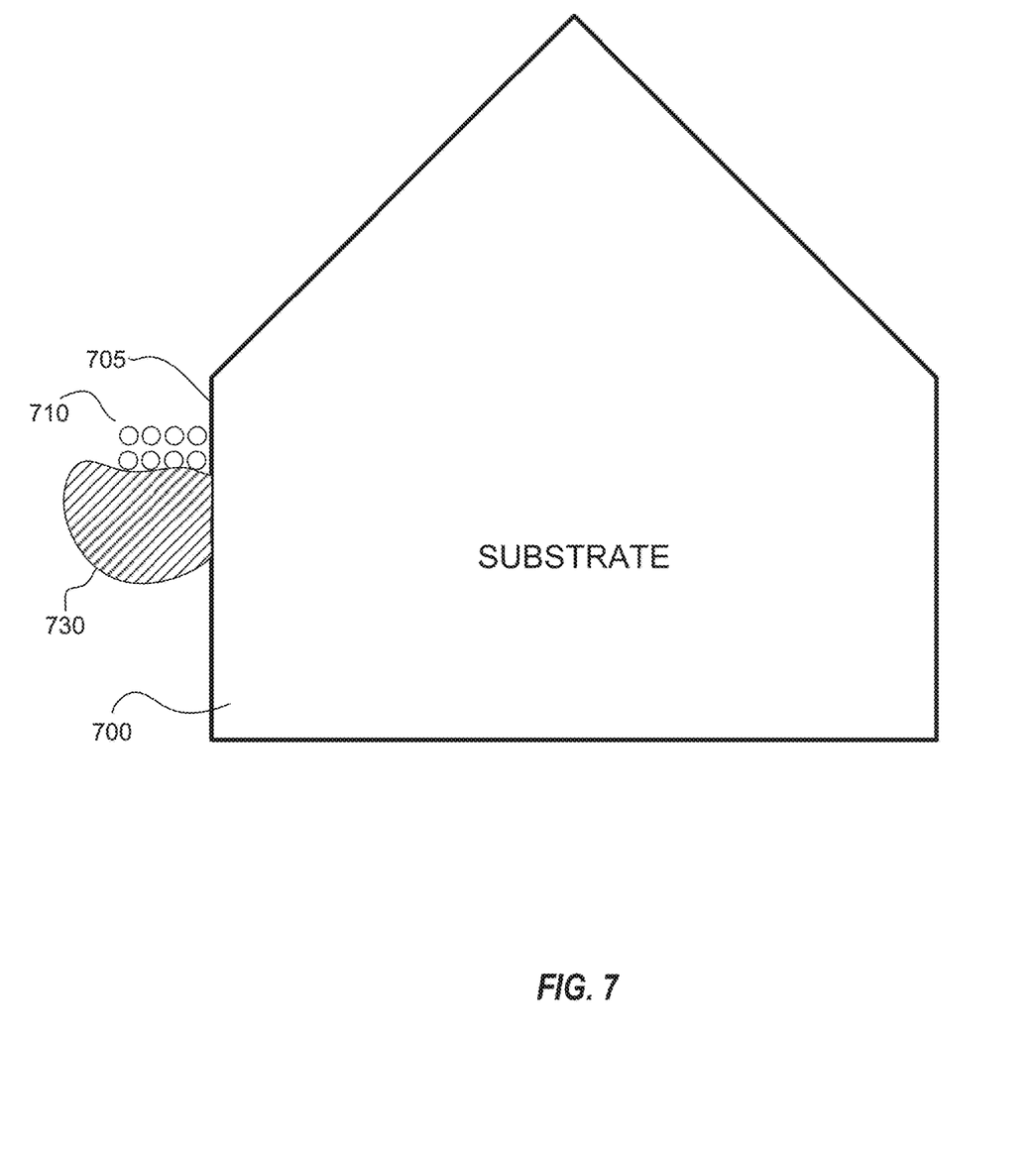
FIG. 7 illustrates application of a conformal material and a powder layer according to an example embodiment.

FIG. 7 illustrates the use of a support structure, e.g., a platform, according to an example embodiment. Referring to FIG. 7, a substrate 700 has a substantially vertical side 705. A mixture 730 is applied to the side 705 below a desired application area to create a support structure. Metal powder 710 is applied to the side 705 supported by the mixture 730. The metal powder 710 is then fused to the vertical side 705 and the support structure 730 is removed. One of ordinary skill will understand that this is merely an example, and a slurry or gel containing metal powder may be applied to the side 705 and supported by the support structure 730.

Figure 8:
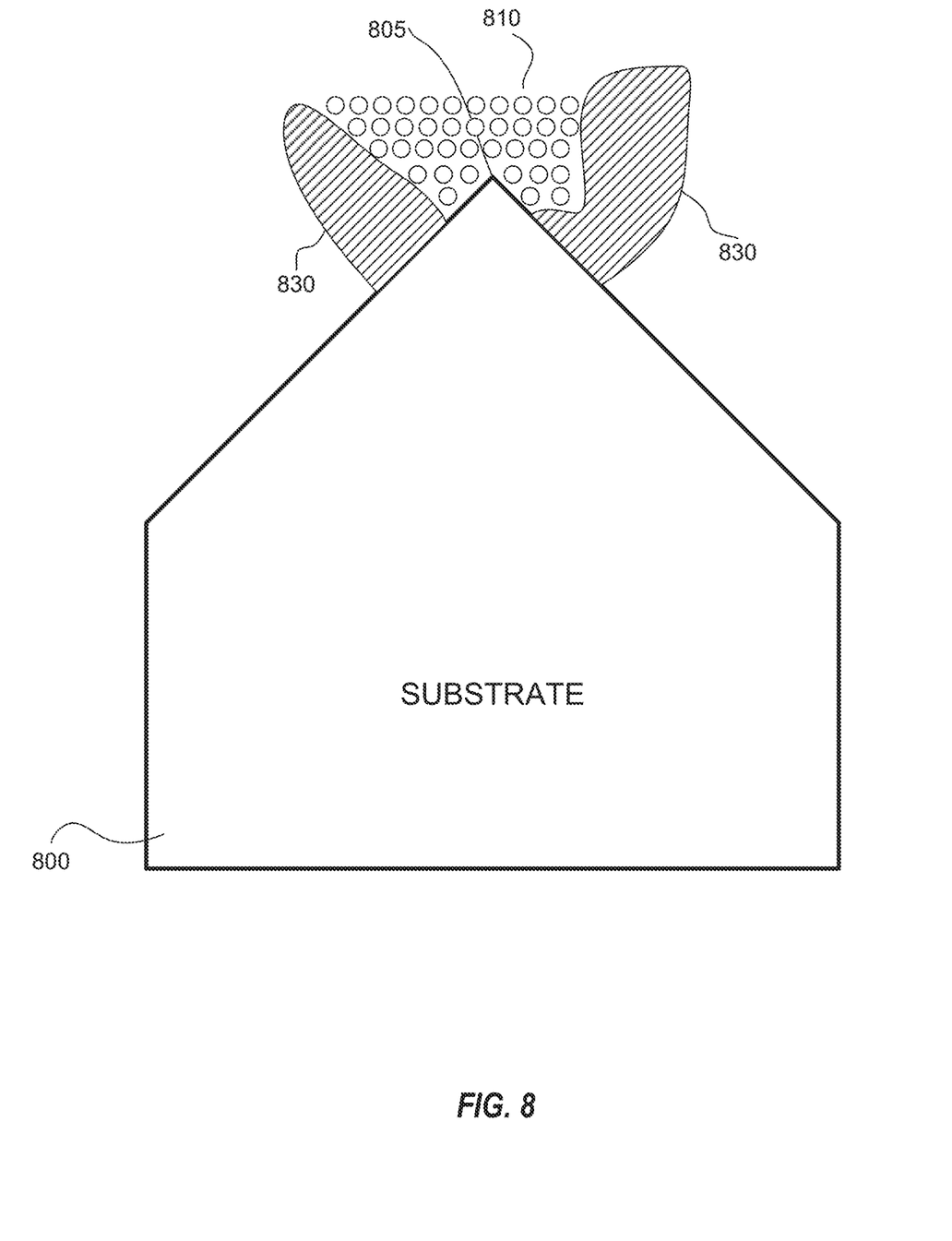
FIG. 8 illustrates application of a conformal material and a powder layer according to an example embodiment.

FIG. 8 illustrates the use of a support structure, e.g., a removable berm or dam, according to an example embodiment. Referring to FIG. 8, a substrate 800 has an application area 805 to which metal powder 810 is to be fused. A mixture 830 is applied surrounding the application area 805 to create a support structure, defining a negative space. Metal powder 810 is applied to the side into the area defined by the support structure 830. The metal powder 810 is then fused to the application area 805, and is shaped according to the space defined by the support structure 830. The support structure is then removed. One of ordinary skill will understand that this is merely an example, and a slurry or gel containing metal powder may be applied to the application area 805 and supported by the support structure 830.

Figure 9:
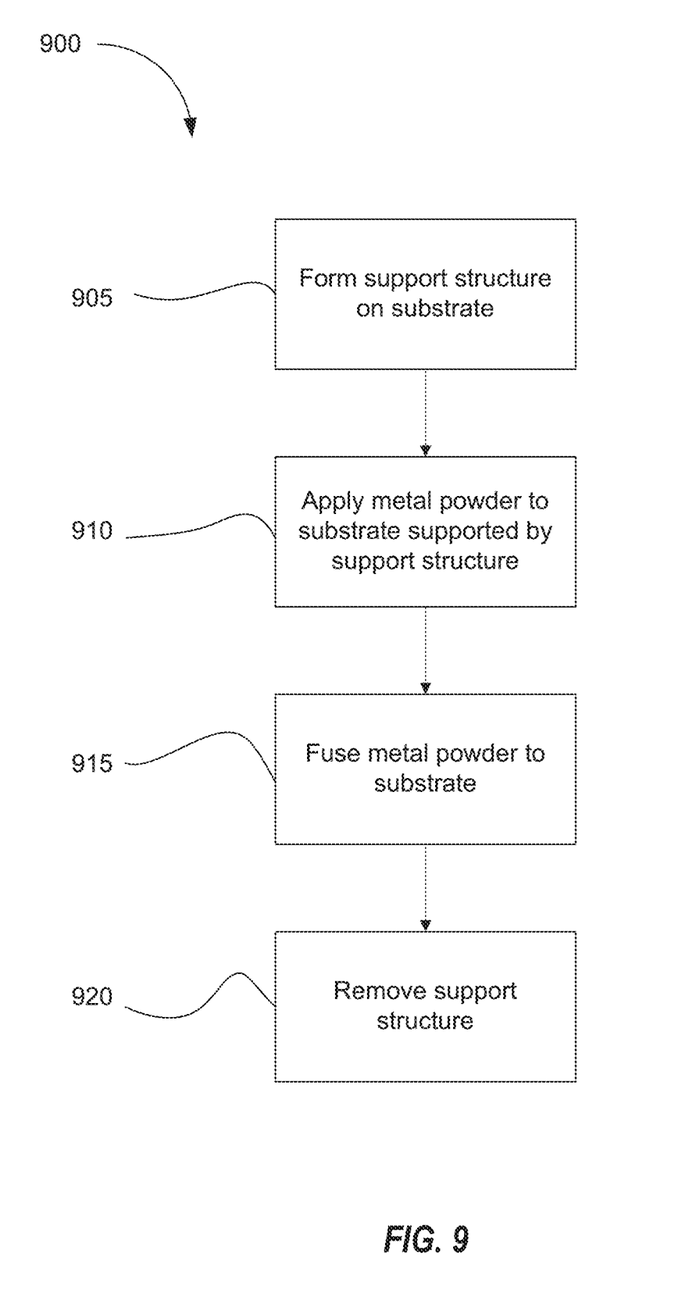
FIG. 9 is a flow diagram of a method of use of a conformal material according to an example embodiment.

FIG. 9 is a block diagram of an application method according to an example embodiment. The method 900 includes forming 905 a support structure. The forming 905 includes applying a slurry, paste, or gel to a substrate to form a support. The slurry, paste, or gel may be applied substantially free-flowing and then solidify, for example, by freezing or through gelation, thermal polymerization, and photopolymerization, or a combination thereof. For example, the slurry, gel, or paste may be applied to the substrate beneath an application site and solidified to form 905 the support structure. In some cases, the support structure may define a negative space around a desired geometry for additive manufacturing.

Once the support structure is formed 905, metal powder is applied 910 to an application site of the substrate supported by the support structure. For example, the support structure may form retaining walls to hold in the metal powder or a base to support the metal powder. In some embodiments, the metal powder is applied 910 mixed with a carrier agent as a slurry, paste, or gel, similar to that described above with reference to FIGS. 4-6.

After applying 910 the metal powder, the metal powder is fused 915 to the substrate. For example, the metal powder may be fused through an SLE process. In some embodiments, the metal powder may be applied 910 and fused 915 in multiple layers.

Once the metal powder is fused 915, the support structure may be removed 920. As non-limiting examples, the support structure may be removed through one or more of burning, melting, dissolving with a solvent, abrading, or breaking. Thus, in some cases, the support structure may act as a temporary platform, dam, or berm. In some embodiments, the support structure may be removed before all layers of the metal powder are applied 910 and fused 915. In this case, the initial deposit becomes the support for subsequent materials and thus functions both as a part of the body and a support/template for additional growth through additive manufacturing. In some embodiments, the support structure may remain for a period of time after the metal powder is fused 915 to the substrate.

Figure 10:
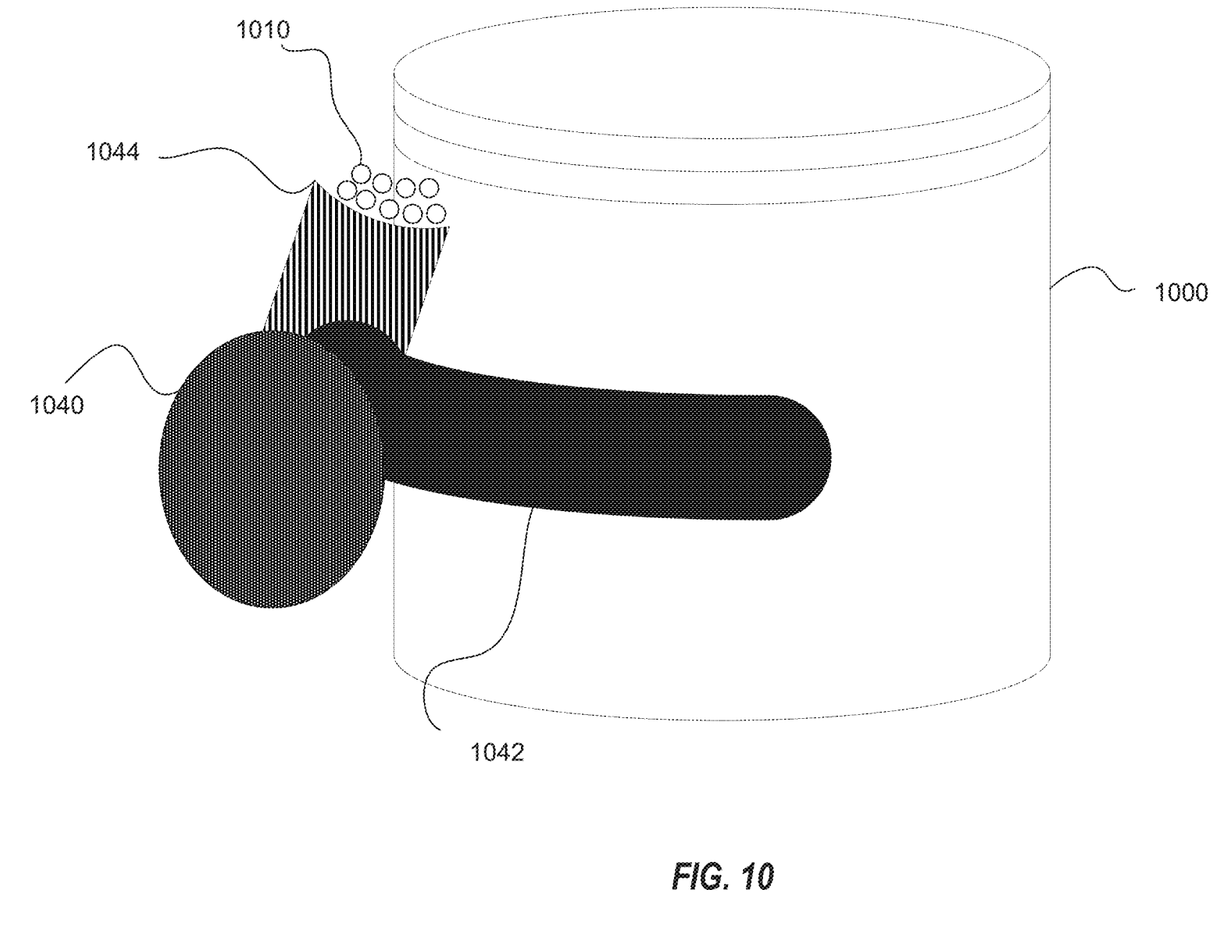
FIG. 10 illustrates application of a support structure and a powder layer according to an example embodiment.

FIG. 10 illustrates the use of a support structure, e.g., a platform, according to an example embodiment. Referring to FIG. 10, a separately formed support structure 1040 is attached to a substrate 1000. The support structure 1040 includes an attachment mechanism 1042, e.g., attachment arms, and a platform 1044, e.g., a support berm. The attachment mechanism 1042 secures the support structure 1040 to the substrate 1000. As non-limiting examples, the attachment mechanism 1042 may include attachment arms that grip the substrate 1000, a clamping mechanism, a snap-on mechanism, or an adhesive. In some cases, the attachment mechanism 1042 may be pre-formed to fit a particular size or shape substrate.

The platform 1044 provides a space to deposit powder 1010 against a side of the substrate 1000. In some embodiments, the platform 1044 may be adjustable relative to the remainder of the support structure 1040. The metal powder 1010 may be fused to the substrate 1000 while being supported by the platform 1044. One of ordinary skill will understand that this is merely an example, and a slurry or gel containing metal powder may be applied and supported by the support structure 1040.

One of ordinary skill will understand that the support structure 1040 is merely an example, and additional support structures are considered within the scope of the disclosure. For example, a separately formed support structure may receive a substrate. As a non-limiting example, metal powder may be applied to the substrate while the substrate is placed within the support structure. The metal powder may be supported by the support structure, and fused to the substrate. Afterwards, the substrate may be removed from within the support structure.

Figures 11A, 11B:
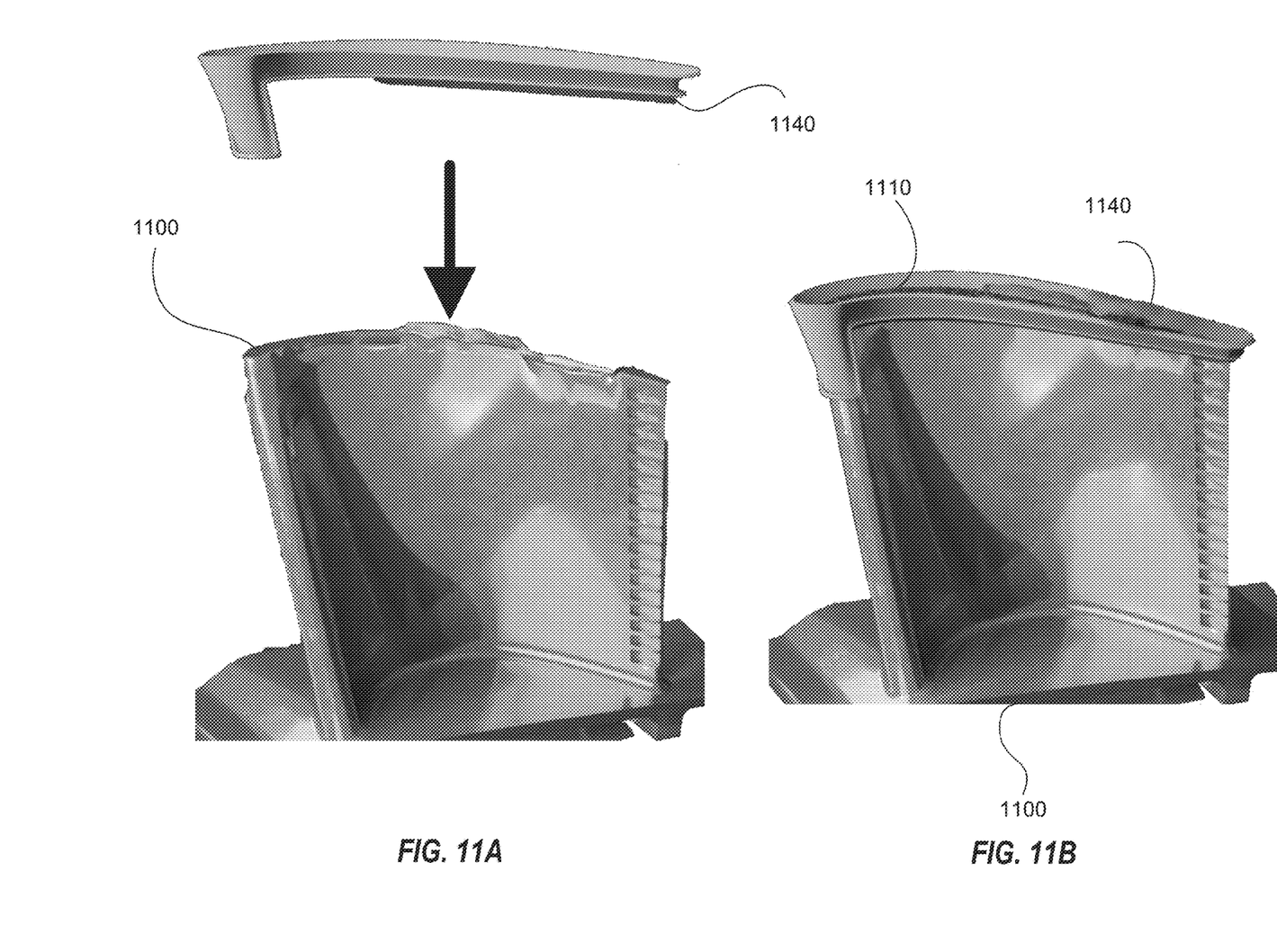
FIGS. 11A and 11B illustrate application of a support structure and a powder layer according to an example embodiment.

FIGS. 11A and 11B illustrate the use of a support structure, e.g., a damming structure, according to an example embodiment. Referring to FIGS. 11A and 11B, a separately formed support structure 1140 placed on a substrate 1100. The support structure 1140 may be dimensioned to encompass a perimeter of the substrate 1100, and define a negative space. Metal powder 1110 is applied to the side into the area defined by the support structure 1140. The metal powder 1110 is then fused to the substrate 1100, and is shaped according to the space defined by the support structure 1140. The support structure 1140 may then removed and reused.

Figure 12:
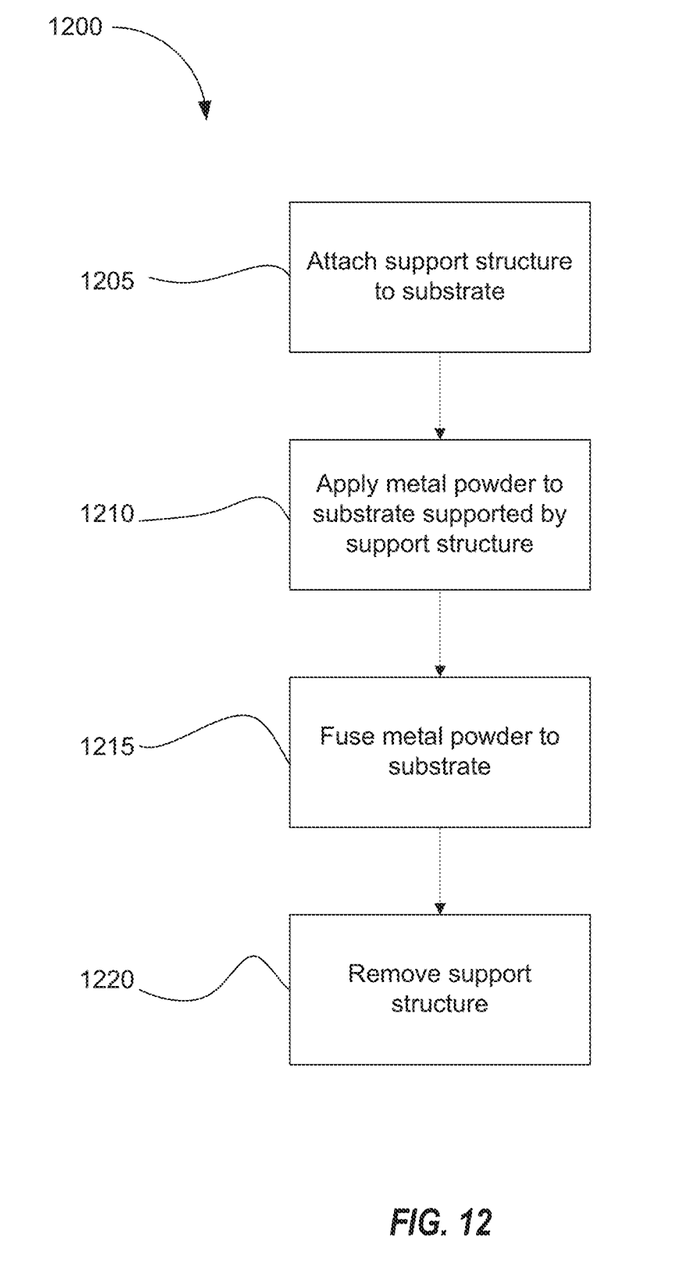
FIG. 12 is a flow diagram of a method of use of a support structure according to an example embodiment.

FIG. 12 is a block diagram of an application method according to an example embodiment. The method 1200 includes attaching 1205 a support structure to a substrate. The support structure may be attached 1205 via, as non-limiting examples, clamping, securing, adhesion, and a snap-on mechanism. In some cases, the support structure may be attached 1205 by placing the support structure on the substrate. In some embodiments, the support structure may be attached 1205 to the substrate by placing the substrate within the support structure. In some embodiments, the support structure may be attached by forming the support structure on the substrate, for example, as described above with reference to FIG. 9. In some cases, the support structure may define a negative space around a desired geometry for additive manufacturing.

Once the support structure is attached 1205, metal powder is applied 1210 to an application site of the substrate supported by the support structure. For example, the support structure may form retaining walls to hold in the metal powder or a base to support the metal powder. In some embodiments, the metal powder is applied 1210 mixed with a carrier agent as a slurry, paste, or gel, similar to that described above with reference to FIGS. 4-6.

After applying 1210 the metal powder, the metal powder is fused 1215 to the substrate. For example, the metal powder may be fused through an SLE process. In some embodiments, the metal powder may be applied 1210 and fused 1215 in multiple layers.

Once the metal powder is fused 1215, the support structure may be removed 1220. As non-limiting examples, the support structure may removed without damaging the support structure, e.g., through unclamping, removing an adhesive, or lifting the support structure off of the substrate. Thus, in some cases, the support structure may be reusable on different substrates or additional portions of the substrate. In some embodiments, the support structure may be removed before all layers of the metal powder are applied 1210 and fused 1215. In this case, the initial deposit becomes the support for subsequent materials and thus functions both as a part of the body and a support/template for additional growth through additive manufacturing. In some embodiments, the support structure may remain for a period of time after the metal powder is fused 1215 to the substrate.

In some embodiments, one or more of the above approaches may be used to repair a part, e.g., through additive repair. For example, a puncture in a hollow metal part may be patched with an application of a metal powder and carrier agent mixture.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims and their equivalents. Although specific terms are employed herein, they are used in a generic and descriptive sense only and not for purposes of limitation.

In the foregoing description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementation," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms should be construed to take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a—given sequence, either temporally, spatially, in ranking, or in any other manner.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims and their equivalents, and may include other examples that occur to those of ordinary skill. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing method comprising:
    attaching a support structure to a substrate, the support structure comprising a pre-formed and reusable portion, the attaching comprising:
        attaching the pre-formed and reusable portion to the substrate with at least one clamp,
        applying a first material as a slurry, paste, or gel to the substrate and the pre-formed and reusable portion, and
        solidifying the applied first material to fully form the support structure comprising the pre-formed and reusable portion and the solidified first material;
    applying metal powder to the substrate, the metal powder being supported by the support structure while contact between the metal powder and the substrate is maintained; and
    fusing the applied metal powder to the substrate to create a unitary part comprising the applied metal powder and the substrate.

2. The method of claim 1 further comprising removing the support structure after fusing the metal powder to the substrate.

3. The method of claim 1, wherein
    the first material is photosensitive, and
    the solidifying comprises exposing the applied first material to ultraviolet light.

4. The method of claim 1, wherein the applied metal powder is fused to the substrate by scanning laser epitaxy.

5. The method of claim 1, wherein the applying the metal powder and the fusing the applied metal powder are repeated to form layers of metal fused to the substrate.

6. The method of claim 1 wherein the support structure forms a retaining wall on a portion of the substrate, the portion of the substrate having an angle greater than an angle of repose of the metal powder while the applied metal powder is fused to the substrate.

7. The method of claim 1, wherein the support structure defines a negative space surrounding a desired geometry for the fused metal powder on the substrate.

8. The method of claim 1, wherein attaching the support structure to the substrate further comprises:
    applying the first material as a slurry, paste, or gel to the substrate and the reusable portion, and
    solidifying the applied first material to form the support structure comprising the reusable portion and the solidified first material.

9. The method of claim 1, wherein the support structure is attached to the substrate at an angle greater than an angle of repose of the metal powder while the applied metal powder is fused to the substrate.

10. The method of claim 1, wherein a portion of the support structure extends in an overhang above the substrate.

11. The method of claim 1, wherein a portion of the support structure extends horizontally outwardly from the substrate such that a space is formed beneath the extending portion of the support structure.

12. The method of claim 6, wherein the metal powder is supported by the support structure against the substrate at an angle greater than the angle of repose while the applied metal powder is fused to the substrate.

13. The method of claim 1, wherein, while the applied metal powder is fused to the substrate, the metal powder is supported by the support structure against the substrate at an angle greater than the angle of repose.

14. An additive manufacturing method comprising:
    attaching a support structure to a substrate, the support structure comprising a pre-formed and reusable portion, the attaching comprising:
        attaching the pre-formed and reusable portion to the substrate with at least one snap-on mechanism,
        applying a first material as a slurry, paste, or gel to the substrate and the pre-formed and reusable portion, and
        solidifying the applied first material to fully form the support structure comprising the pre-formed and reusable portion and the solidified first material;
    applying metal powder to the substrate, the metal powder being supported by the support structure while maintaining contact between the metal powder and the substrate; and
    fusing the applied metal powder to the substrate to create a unitary part comprising the applied metal powder and the substrate.

* * * * *